United States Patent Office 3,157,123
Patented Nov. 17, 1964

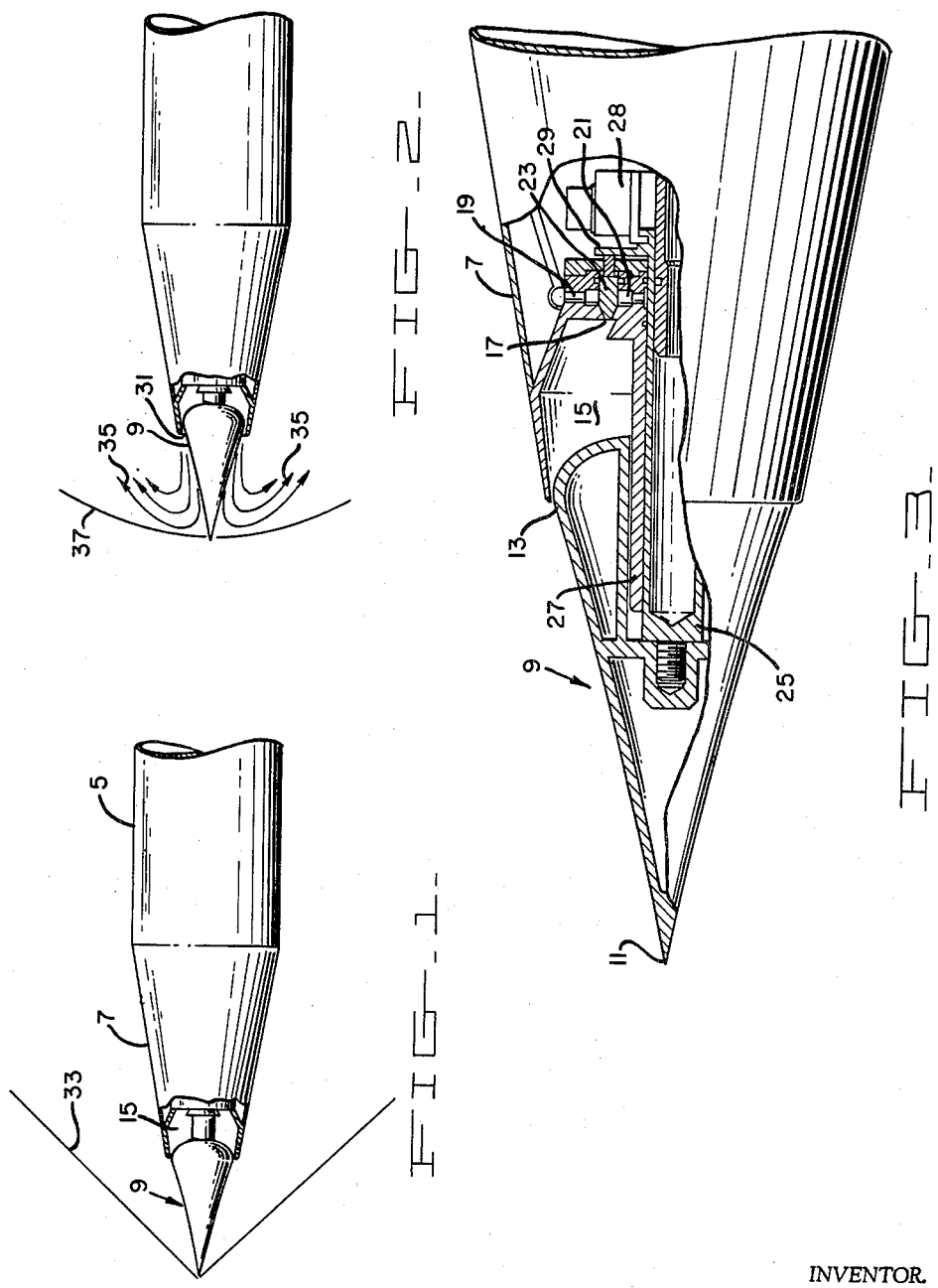

3,157,123
RETRO-NOZZLE
James C. Matheson, Jr., Lake Park, Fla., assignor to United Aircraft Corporation, East Hartford, Conn., a corporation of Delaware
Filed Feb. 6, 1963, Ser. No. 256,736
2 Claims. (Cl. 102—50)

In many applications of missiles which operate in the earth's first atmosphere at various altitudes and air speeds, it is necessary to provide controlled acceleration and deceleration. A typical example is an anti-missile missile which must be accurately maneuvered to intercept its target. In the past, deceleration has been accomplished by aerodynamic drag brakes or retrograde jets or some combination of the two. The drag brake is effective at high air speeds, particularly at low altitudes, but is relatively ineffective at low air speeds or very high altitudes. Retrograde jets are effective at low speeds and extreme altitudes but become decreasingly efficient as high ram jet pressures are encountered at high air speeds and lower altitudes.

Conventional retro-jets employing convergent-divergent expansion nozzles are relatively ineffective for several reasons. In the first place, the configuration of the retro-nozzle mounted in the nose of a slender supersonic aerodynamic vehicle requires that a blunt nose shape be employed which has a high drag even when the retro-jet is inoperative. With the blunt nose shape, a detached normal shock wave occurs which has a much higher drag than the attached oblique shock wave of a pointed nose at supersonic speeds. Further, as is often the case, if the missile airspeed (or Mach number) and altitude vary over a wide range in attacking different targets, the efficiency of the retro-nozzle or the amount of thrust that it can generate for any given rate of flow of the jet gases, will also vary widely. This is because the pressure ratio across the nozzle (upstream pressure of the jet divided by the pressure of the atmosphere at the nozzle exit plane) is greatly affected by the back pressure or ram pressure. Convergent-divergent nozzles are sized for a certain expansion area ratio to which only one pressure-ratio corresponds exactly. If the actual pressure ratio to which the nozzle is subjected is greatly lower than the "design" pressure ratio, over-expanded performance and eventually jet separation occur with a drastic reduction in nozzle "thrust coefficient," as is well known. In the present invention, this disadvantage is overcome by the use of an external expansion nozzle.

In accordance with the present invention, a drag augmented retro-nozzle is provided to minimize the effects of aerodynamic drag when the retro-jet is inoperative and to utilize the effect of a greatly increased drag force when the jet is operative to augment the retrograde thrust of the jet. Thus, as the normal thrust of the retrograde jet is diminished at high air speeds, this factor is compensated for by the increased drag of the shock wave. This allows the nozzle to be designed with a large expansion ratio for efficient operation at high pressure ratios (low air speeds) with the drop off in jet thrust being compensated for by the increased drag when the jet is being expelled.

Generally speaking, the invention is carried out by providing an external expansion or spike nozzle as the retro-jet device with the spike nozzle also being employed to provide a sharply pointed extension of the missile nose when in an extended position.

In accordance with a preferred embodiment of the invention, a connection is provided between the actuating means for the spike nozzle and an injector valve so that as the spike is brought into the inoperative position, the flow of fuel through the injector is automatically cut off.

In the drawing forming a part of this application:
FIGURE 1 is a partial view of a missile embodying the present invention, partly in section, showing the position of the spike when the jet is inoperative.
FIGURE 2 is a view similar to FIGURE 1 showing the nozzle with the jet operating.
FIGURE 3 is an enlarged sectional view showing details of the novel nozzle of the present invention.

Referring now to the drawings by reference characters, there is shown a missile having a body 5 with a nose 7 in the form of a hollow truncated right cone. Within the hollow of the cone the spike nozzle generally designated 9 is located. The spike nozzle 9 has a pointed end 11 and terminates in a rear portion 13 of such size that it forms a substantially smooth continuation of the nose 7.

Within the nose 7 a combustion zone 15 is provided having an injector 17 for the introduction of a liquid propellant. The injector 17 is connected to the passages 19 and 21 which supply liquid propellants to the combustion chamber 15 through the injector 17. A valve element 23 is adapted to close the injector when in a forward position and to open the injector when in a retracted position. It will be understood that the fuel and the oxidizer supplied would normally be of a hypergolic nature so that they ignite on being merely mixed with each other; thus no ignition device need be employed. However, the invention may also be carried out with non-hypergolic fuels by providing an ignition device in the combustion zone.

The nozzle 9 is carried on a shaft 25 which fits over the tubular element 27 in sliding relationship. Tubular element 27 forms part of the frame structure of the missile. The shaft 25 in turn is connected to an actuating mechanism 28 to move the nozzle in and out of operative position. The mechanism 28 has thereon an arm 29 attached to a valve body 23 fitting within injector 17. Thus, when the nozzle is in the inoperative position, as is shown in FIGURES 1 and 3, the injector 17 is closed by means of the valve element 23. However, as the actuating mechanism draws the nozzle 9 to the rear, as is shown in FIGURE 2, the valve body 23 is also moved to the rear, opening the injector. It will also be apparent that as the nozzle 9 moves to the rear a space 31 will open up between the nozzle and the nose for the discharge of the retro-jet.

In FIGURES 1 and 2 the shock waves produced by the two different positions of the nozzle are shown. In FIGURE 1, the nozzle is in the inoperative position, i.e., forms a substantially smooth continuation of the nose cone. Here an attached, oblique shock wave 33 is provided. It is well known that this type of shock wave produces minimum drag. In FIGURE 2, the jet is shown operative with the missile moving at a supersonic speed. Here the combustion gases issuing from the annular space 31 and represented by the arrows 35 encounter the air and are turned back, forming the substantially normal shock wave 37 and producing a high drag. At lower rates of speed, the shock wave 37 would not be formed, but here the jet itself would be much more effective in retarding the missile.

I claim:
1. A drag augmented retro-nozzle comprising in combination:
   (a) a missile having a nose in the form of a right, hollow, truncated cone with the smaller truncated end forward;
   (b) a combustion zone within said nose;
   (c) a spike fitting within said nose at the forward end and extending outwardly therefrom;

(d) spike-actuating means for moving the spike to first and second positions;
(e) said spike forming a substantially smooth continuation of the outer surface of the conical nose in the first position; and
(f) the structure providing an annular passage between the spike and the nose for the discharge of combustion gas when the spike is in the second position.

2. A drag augmented retro-nozzle comprising in combination:
(a) a missile having a nose in the form of a right, hollow, truncated cone with the smaller truncated end forward;
(b) a combustion zone within said nose;
(c) an injector for injecting a liquid propellant into the combustion zone;
(d) valve means for controlling the supply of liquid propellant to the combustion zone;
(e) a spike fitting within said nose at the forward end and extending outwardly therefrom;
(f) spike-actuating means for moving the spike to first and second positions;
(g) said spike forming a substantially smooth continuation of the outer surface of the conical nose in the first position;
(h) the structure providing an annular passage between the spike and the nose for the discharge of combustion gas when the spike is in the second position; and
(i) said spike-actuating means also serving to close the valve means in the first position and open the valve means in the second position.

References Cited by the Examiner
UNITED STATES PATENTS

| | | | |
|---|---|---|---|
| 2,613,497 | 10/52 | MacDonald | 60—35.6 |
| 2,870,603 | 1/59 | Long | 60—35.6 |

SAMUEL FEINBERG, *Primary Examiner.*